United States Patent
Malatesta

(10) Patent No.: US 8,252,149 B2
(45) Date of Patent: Aug. 28, 2012

(54) METHOD OF CLEANING AND RECYCLING GLYCOL-TAINTED WATER FROM DE-ICING OPERATIONS AT AIRPORTS

(76) Inventor: Brad Michael Malatesta, Granville, OH (US)

(*) Notice: Subject to any disclaimer, the term of this patent is extended or adjusted under 35 U.S.C. 154(b) by 961 days.

(21) Appl. No.: 12/220,276

(22) Filed: Jul. 23, 2008

(65) Prior Publication Data

US 2009/0277770 A1    Nov. 12, 2009

Related U.S. Application Data

(60) Provisional application No. 60/961,725, filed on Jul. 24, 2007.

(51) Int. Cl.
*B01D 3/42* (2006.01)
*B64F 5/00* (2006.01)
*C02F 1/04* (2006.01)
*C07C 27/28* (2006.01)

(52) U.S. Cl. ............... 203/3; 159/47.3; 203/10; 203/18; 203/94; 203/98; 244/134 R; 568/913; 568/916

(58) Field of Classification Search ............... 159/47.3; 203/3, 10, 18, 94, 98, DIG. 16; 210/799, 210/805; 244/134 R; 568/913, 916
See application file for complete search history.

(56) References Cited

U.S. PATENT DOCUMENTS

| | | |
|---|---|---|
| 3,243,123 A | 3/1966 | Ingraham et al. |
| 4,073,437 A | 2/1978 | Thornton-Trump |
| 4,191,348 A | 3/1980 | Holwerda |
| 4,254,821 A | 3/1981 | Matsuda et al. |
| 4,270,974 A | 6/1981 | Greenfield et al. |
| 4,573,802 A | 3/1986 | Kerrigan et al. |
| 4,826,107 A | 5/1989 | Thornton-Trump |
| 5,028,017 A | 7/1991 | Simmons et al. |
| 5,076,895 A | 12/1991 | Greenfield et al. |
| 5,096,145 A | 3/1992 | Phillips et al. |
| 5,104,068 A | 4/1992 | Krilla et al. |
| 5,244,168 A | 9/1993 | Williams |
| 5,535,877 A * | 7/1996 | Eastcott et al. .............. 203/18 |
| 5,845,848 A | 12/1998 | Amako et al. |
| 5,904,321 A * | 5/1999 | Cox et al. ............. 244/134 R |
| 5,928,477 A * | 7/1999 | Gammon et al. .............. 203/18 |
| 6,120,651 A | 9/2000 | Gammon |
| 6,375,803 B1 | 4/2002 | Razzaghi et al. |
| 6,638,398 B1 | 10/2003 | Ramm-Schmidt et al. |
| 6,733,636 B1 | 5/2004 | Heins |
| 6,820,841 B2 | 11/2004 | Mittereder et al. |
| 7,077,201 B2 | 7/2006 | Heins |
| 7,150,320 B2 | 12/2006 | Heins |

(Continued)

FOREIGN PATENT DOCUMENTS

CA    2 116 827 A1    5/1995

(Continued)

*Primary Examiner* — Virginia Manoharan
(74) *Attorney, Agent, or Firm* — Blank Rome LLP

(57) ABSTRACT

The invention disclosed and claimed herein relates to treatment of water contaminated with glycol to be recycled for further effective use of the cleaned water resulting therefrom, especially at airports. More specifically, this invention relates to improved techniques for efficiently and reliably generating continuous flows of cleaned water as well as a continuous flow of recyclable glycol water of controlled concentration.

9 Claims, 1 Drawing Sheet

U.S. PATENT DOCUMENTS

| | | | |
|---|---|---|---|
| 2003/0127154 A1* | 7/2003 | Kneringer et al. | 141/95 |
| 2004/0079491 A1* | 4/2004 | Harris et al. | 159/16.1 |
| 2005/0178915 A1* | 8/2005 | Kneringer et al. | 244/134 R |
| 2006/0011525 A1* | 1/2006 | Hoffjann et al. | 210/136 |
| 2008/0044325 A1* | 2/2008 | Radhakrishnan et al. | 422/211 |
| 2009/0134068 A1* | 5/2009 | Falkiner et al. | 208/188 |

FOREIGN PATENT DOCUMENTS

| | | |
|---|---|---|
| EP | 0 637 620 A2 | 2/1995 |
| EP | 0 820 793 A2 | 1/1998 |
| WO | WO 93/18834 A1 | 9/1993 |

* cited by examiner

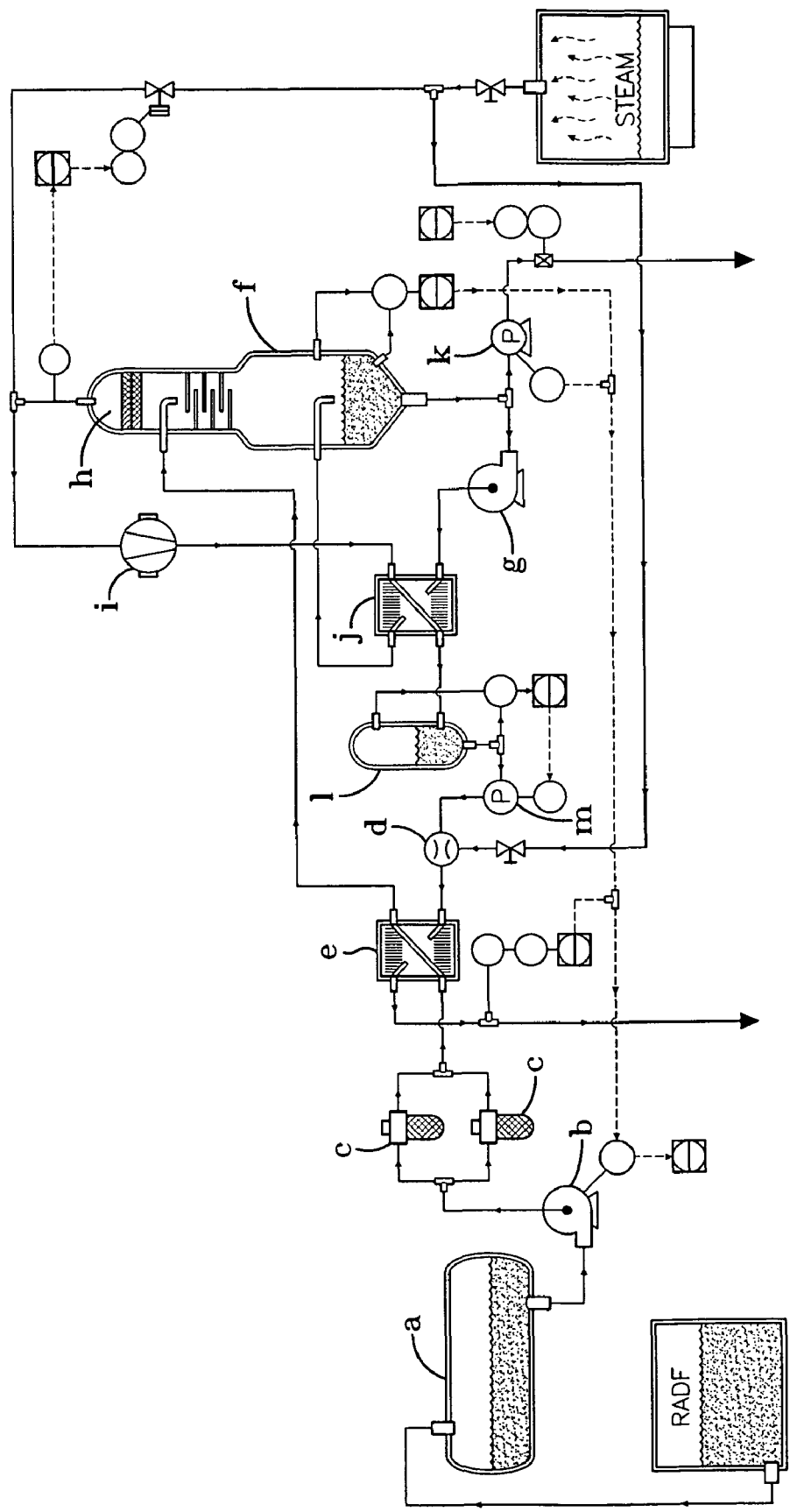

METHOD OF CLEANING AND RECYCLING GLYCOL-TAINTED WATER FROM DE-ICING OPERATIONS AT AIRPORTS

CROSS-REFERENCE TO RELATED APPLICATIONS

This application claims the priority benefit of U.S. Provisional Application Ser. No. 60/961,725, filed Jul. 24, 2007, which is hereby incorporated in its entirety by reference.

TECHNICAL FIELD OF THE INVENTION

The invention disclosed and claimed herein relates to treatment of water contaminated with glycol to be recycled for further effective use of the cleaned water resulting therefrom, especially at airports. More specifically, this invention relates to improved techniques for efficiently and reliably generating continuous flows of cleaned water as well as a continuous flow of recyclable glycol-water concentrate of controlled concentration.

BACKGROUND OF THE INVENTION

The formation of ice on the wings of an airplane can reduce the lift and increase the drag by degrading the performance of the airfoil. Additionally, the ice may break away from the wing and be ingested by an engine, possibly causing a failure of the engine and endangering the safety of the passengers of the aircraft. To remove and prevent the build-up of ice on the wings, the skin of the wings can be sprayed with a fluid that has a low freezing point, such as a glycol. In cold climates the wings are typically sprayed at the airport before takeoff. The glycol forms a protective layer on the aircraft. The glycol has low shear strength and allows the ice to be sheared from the wings. Wings are sprayed with a heated dilute glycol solution (propylene, ethylene or a mixture of the two, in water). The solution typically also holds wetting agents, rust inhibitors, flame retardants, thickeners and other materials, depending on the Class of the solution being used, and depending on the nature of other fluids that are deposited to airport runways and roads during daily operations.

Conventional aircraft deicing by hot deicing fluid (Type I) washdown from ground or mobile boom systems has been in use for decades with no basic changes to this technology other than refinements to the deicing fluid heating and application systems. Some of the patents covering conventional deicing and its refinements are as follows U.S. Pat. No. 3,243,123, to D. M. Ingraham, et. al., issued Mar. 29, 1966; U.S. Pat. No. 4,073,437 to Thornton-Trump, issued Feb. 14, 1978; U.S. Pat. No. 4,826,107 to Thornton-Trump, issued May 2, 1989 and U.S. Pat. No. 5,028,017, to Simmons, et al., issued Jul. 2, 1991. Other publications describe various deicing systems to improve the deicing process, either by reducing or eliminating the use of glycol, or by applying glycol in a more efficient manner such that the glycol usage is reduced for instance: U.S. Pat. No. 5,244,168 to Williams, issued Sep. 14, 1993 for A Methodology And Apparatus For Forced Air Aircraft Deicing and U.S. Pat. No. 5,104,068 to Krilla et al., issued Apr. 14, 1992.

Presently, aircraft deicing is carried out by applying glycol based deicing fluids, which may be propylene glycol, ethylene glycol or a mixture of the two glycols.

These fluids are sprayed on aircraft to lift accumulated ice and it is believed that propylene glycol prevents ice buildup. Numerous composition and method patents exist on this application and have been disclosed in U.S. Pat. No. 4,191,348 to Holwerda; U.S. Pat. No. 4,254,821 to Matsuda et al.; U.S. Pat. No. 4,573,802 to Kerrigan et al.; U.S. Pat. No. 4,826,107 to Thornton-Trump; U.S. Pat. No. 5,096,145 to Phillips et al.; U.S. Pat. No. 5,244,168 to Williams; and U.S. Pat. No. 5,845,848 to Amako et al., and of which are incorporated herein by reference.

Most of the glycol that is sprayed onto the wings falls off of the plane and flows into a drainage system which removes the de-icing fluid. An aircraft is typically sprayed with gallons of dilute and heated de-icing fluid that is used only one time.

Another drawback of certain prior art deicing fluids is the high chemical and biological oxygen demand that make them environmentally unfavorable. The glycols are exemplary of deicing fluids that particularly suffer from this type of environmental drawback, and most municipalities govern the amount of glycol-tainted water that can be released to local water treatment facilities.

It would be desirable to provide a recovery system that can collect and recycle both the water from glycol-containing water as well as the glycols from de-icing fluid sprayed onto an airplane so that both the water and the fluid can be reused.

Recycling the de-icing fluid would decrease the cost of spraying the aircraft by providing a recyclable product that may be used for a variety of alternative uses. Recycling the water from de-icing operations would also reduce overall costs by eliminating the cost to municipalities and the airports which must control the release of glycol-tainted water, as well as providing a beneficial use of the water at the airport location, saving the cost of using fresh water or water from the associated water authority. Another benefit of recycling the water recovered from RDAF is that the recovered water will not contain undesirable materials typically found in a municipal water supply (such as minerals, etc.).

Most attempts to adapt MVR for use in recycling glycol from de-icing operations have been less than completely successful as many such operations release treated water into the local sewer system or transport the treated water off-site.

Some prior art systems may use reverse osmosis in order to pre-concentrate the dilute glycol de-icing fluid prior to use of MVR.

Most other systems do not provide a resultant glycol concentrate at higher concentrations which may require further concentration of the fluid or, if the more dilute concentrate is shipped, will require greater shipping volume.

It would also be desirable to have such recycling occur in a continuous processing (or continuous batch processing) and to be able to produce two recycled products in the same operation at an airport site, without the environmental risk of releasing glycol-containing water to the local water shed or water treatment facility.

It is also desirable to be able to produce a glycol concentrate that can be efficiently shipped for reformulation into a variety of recycled products for other industrial uses.

SUMMARY OF THE INVENTION

The present invention relates to a method and apparatus for separating water from glycol-containing water, such as that collected at airports from deicing operations.

Mechanical Vapor Recompression (MVR) Evaporation is an energy efficient process that produces high quality distilled water from wastewater containing dissolved glycol. With evaporation, high quality water is boiled from wastewater and can be later condensed as distilled water. The glycol(s) remain in solution and are removed from the system as concentrated blowdown. Concentrate may removed from the system at a controlled rate so that the glycol concentration in the apparatus remains at the desired value. Concentrate does not pass through a secondary heat exchanger to recover energy.

Producing distilled water from direct-fired distillate requires approximately 970 BTU/lb of heat energy, at a liquid temperature of 212° F. and at atmospheric pressure. Due to the sophisticated heat exchanger configuration in MVR evaporation, distilled water can be theoretically produced with only 25-28 BTU/lb, ⅟₄₀th the energy.

Examples of mechanical vapor recompression systems, such as multi-effect evaporation system from which the present invention may be constructed and practiced, are described in U.S. Pat. No. 4,270,974 and U.S. Pat. No. 5,076,895, the disclosures of which are hereby incorporated by reference. Other patents describing MVR include U.S. Pat. Nos. 6,375,803; 6,638,398; 6,733,636; 7,077,201 and 7,150,320, the disclosures of which are hereby incorporated by reference.

Other such systems, such as the preferred system, may be obtained commercially from Clean Water Ltd. of Columbus, Ohio.

It has been discovered that MVR may be used in a continuous system to produce both water clean enough for such uses as non-potable uses at the airport itself, while also providing a continuous flow of a high value, reusable glycol concentrate.

Accordingly, the present invention includes a method of removing and recycling water from glycol-containing water collected at an airport following use of the glycol as a de-icing agent, the method comprising: (a) collecting water containing the glycol in a holding vessel at an airport; and (b) removing water from the collected water containing the glycol by an evaporative process; and (c) recycling the water for use at the airport.

The water may be collected from de-icing operations in accordance with known methods and apparatus, typically directed to holding tanks from which the glycol-containing water may be transported in trucks or conducted through conduits directly to the MVR system.

The water is removed from the glycol-contaminated water through any evaporative method, such as that described herein. The water produced by use of the method and apparatus of the present invention is of sufficiently high purity that it may be used direct in a wide variety of non-potable uses on the airport grounds.

With respect to the recycling of the cleaned water, it may be used for any purpose appropriate for the quality of the resultant water. For instance, the water may be recycled for a use such as one or more uses selected from the group consisting of (1) grounds irrigation, (2) cleaning of aircraft, (3) runway cleaning at the airport and/or (4) as a coolant in HVAC systems.

The invention also includes a method of continuously removing water from glycol-containing water collected at an airport following use of the glycol as a de-icing agent, the method comprising: (a) collecting water containing the glycol (RADF) in a holding vessel at an airport or conducting the water containing the glycol in a conduit directly from the de-icing site, the concentration of the glycol in water containing the glycol being less than 35%, and more typically well less than 5%; and (b) continuously removing water from the collected water containing the glycol through a monitored mechanical vapor recompression system, so as to produce a flow of water containing the glycol having a concentration in the range of from about 35% to about 45%.

In a preferred method variation, this may be done without the use of reverse osmosis, such that the original glycol concentration in the RADF is less than 1% (typically about 0.25%).

One of the advantages of the preferred system and method of the present invention is that de-icing water at relatively low concentrations (i.e., below 5%) may be sent directly to the MVR system of the present invention. This is in contrast to existing systems which typically use reverse osmosis to pre-concentrate the de-icing water solution before subjecting it to MVR.

The present invention also includes an apparatus for removing water from glycol-containing water, comprising: (a) a forced circulation MVR heated evaporator and having an input conduit and an output conduit, the input conduit adapted to direct relatively low-glycol water to the forced circulation MVR heated evaporator so as to evaporate water in the form of steam from the relatively low-glycol water so as to produce relatively high-glycol water, the forced circulation MVR evaporator also adapted to contain the relatively high-glycol water remaining after evaporation; (b) a monitor adapted to determine the concentration of glycol in the relatively high-glycol water remaining after or during evaporation, and to issue a control signal in response to the determination; (c) a liquid output conduit, adapted to conduct a flow of the high-glycol water from the forced circulation MVR evaporator; and (d) a flow controller adapted to control the flow of the high-glycol water from the forced circulation MVR evaporator in response to the control signal.

It is preferred that the flow controller is adapted to control the flow of the high-glycol water from the forced circulation MVR evaporator such that the concentration of glycol in the high-glycol water is in the range of from about 35% to about 45%.

The resultant glycol concentrate can be efficiently shipped for reformulation into a variety of recycled products for other industrial uses, such as for coolants, dust control, windshield washer fluid, etc.

It is also preferred that the apparatus additionally comprises a steam outlet conduit, adapted to conduct the steam from the forced circulation MVR evaporator, and a bubbler adapted to remove glycol from the steam. As an alternative, the system of the present invention may use a stacked media column for further removal of the glycol from the steam. Another optional variation is to treat the condensed steam through reverse osmosis in order to further remove glycol from the condensed steam. In addition, the vapor separator may be fitted with a scrubbing column that can be used either; distillation trays; random packing; or stacked packing. These devices allow the evaporator vapor holding small amounts of evaporated glycol to come into intimate contact with the dilute material feeding the forced circulation MVR evaporator, thereby reducing the glycol content of the evaporated vapor leaving the column. The distillate produced from the evaporator, condensed evaporated vapor leaving the scrubbing column) may be processed in filtration equipment (reverse osmosis, and or ultrafiltration) to further remove glycol from the flow.

The method and apparatus of the present invention may be applied to airport de-icing systems that use collection tanks for capturing water-glycol run-off from de-icing operations, such as those described for instance, in U.S. Pat. No. 6,820,841, which is hereby incorporated by reference.

BRIEF DESCRIPTION OF THE DRAWINGS

FIG. 1 is a schematic of an MVR system in accordance with one embodiment of the present invention that may be used in accordance with the present invention.

DETAILED DESCRIPTION OF THE PREFERRED EMBODIMENT

In accordance with the foregoing summary, the following present a detailed description of a preferred embodiment of the present invention which is currently considered to be the best mode thereof.

FIG. 1 is a schematic of an MVR system that may be used in accordance with one embodiment of the method of the present invention. This system may be used to produce cleansed (distilled) water which in turn may be utilized for a wide variety of uses at the airport, such as for airplane cleaning, irrigation and other non-potable uses. The distilled water may be conducted from the MVR system of FIG. 1 through conduits to an airplane cleaning hangar or facility, or to irrigation lines for the airport grounds.

Recovery of high quality water (distillate) from recovered aircraft deicing fluids may be accomplished using a forced circulation evaporation system commercially available from Clean Water Ltd. of Columbus, Ohio. The recovered aircraft deicing fluid primarily contains propylene glycol, ethylene glycol or a mixture of propylene and ethylene glycols, in water. The aircraft deicing fluid also contains very minor amounts of wetting agents, rust inhibitors, flame retardants, thickeners, machine oils, and other materials that are deposited onto airport roads and run-ways during daily operations. These minor components may be removed or treated following collection of the RADF concentrate.

FIG. 1 is a schematic of an MVR system in accordance with a preferred embodiment of the present invention, and that may be used in accordance with the method of the present invention. FIG. 1 shows a MVR system modified to better perform the preferred methods of the present invention.

FIG. 1 shows the main components of the preferred evaporation system, that are as follows:
(a) Recovered Dilute Aircraft Deicing Fluid storage tank.
(b) Evaporator Feed pump (centrifugal type).
(c) Feed bag filter station.
(d) Distillate preheating using direct steam injection.
(e) Feed Preheating against distillate heat exchanger (shell and tube or plate type).
(f) Flash Vessel (vapor body).
(g) Concentrate Circulation Pump.
(h) Evaporated Vapor Scrubbing Column.
(i) Mechanical Vapor Recompressor (e.g., Centrifugal or Positive Displacement Type)
(j) Circulated Fluid Heater (shell and tube of plate type).
(k) Concentrated Recovered Aircraft Deicing Fluid Extraction Pump (Centrifugal or Positive Displacement Type)
(l) Distillate Bottle
(m) Distillate Pump The product path through the system may proceed as follows:

Dilute Recovered Aircraft Deicing Fluid (RADF) is typically collected at the airport of interest and normally is transferred by truck or other means (such as dedicated pipes or gutters or other fluid conduits) to the Recovered Aircraft Deicing Fluid storage tank (a) (the fluid may also be collected and delivered directly to the system without the use of a storage tank although the liquid volumes involved typically will require large storage tanks). Evaporator Feed Pump (b) routes the RADF from storage tank (a) through the Bag Filter Station (c) to remove suspended matter, and then further through the Feed Preheater (e) delivering the controlled flow to the top of the Evaporated Vapor Scrubbing Column (h) (which optionally may include a bubbler or a tray column, randomly packed column, or a stacked media column ). The Dilute RADF passes down through the Evaporated Vapor Scrubbing Column, contacting evaporated vapor, falling into the concentrated RADF in the lower part of the Flash Vessel (f).

Concentrate Circulation Pump (g) continuously delivers the RADF to the Circulated Fluid Heater (j) which raises the temperature of the flow. The heated Circulated Flow is delivered back to the Flash Vessel (f) where flash evaporation takes place as the pressure in the flash vessel is lower than the saturated temperature of the Circulated Fluid leaving the Circulated Fluid Heater.

Evaporated vapors (generated in the flash evaporation process) containing propylene glycol, ethylene glycol or a mixture of propylene and ethylene glycol (glycol) flow up through the Evaporated vapor Scrubbing Column, coming into contact with the Dilute RADF feeding the Forced Circulation Evaporation System. The Evaporated vapors leaving the top of the column, now containing a reduced glycol concentration are recompressed by the Mechanical Vapor Recompressor (i), and are delivered to the Circulated Fluid Heater, where the majority of the vapors condense, forming the Distillate (high quality recovered water, which may the be conducted or transported elsewhere on the airport grounds for further use). The Distillate accumulates in Distillate Bottle (l), fitted with a level control system. The level control system modulates the operation of Distillate Pump (m) as necessary, removing the Recovered High Quality Water from the Clean Water Ltd. Forced Circulation Evaporation System.

Extraction Pump (k) maintains the level in the lower part of the Flash Vessel, routing the concentrate to the Concentrated RADF receiver outside of the evaporation system.

The Flash Vessel is pressure controlled. The concentrated RADF fluid boils at a pressure and corresponding saturated liquid and vapor temperature at or above atmospheric pressure. Steam addition typically is used to maintain the pressure in the Flash Vessel.

The MVR system shown in FIG. 1 also preferably includes a monitor adapted to determine the concentration of glycol in the relatively high-glycol water in the forced circulation MVR evaporator, and to issue a control signal in response to the determination.

The system also includes a liquid output conduit adapted to conduct a flow of the high-glycol water from the forced circulation MVR evaporator; and a flow controller adapted to control the flow of the high-glycol water from the forced circulation MVR evaporator in response to the control signal, to produce a flow within a desired or pre-determined concentration range. This may be done by assay of an appropriate property of the high-glycol water in the forced circulation MVR evaporator, such as viscosity, pH, electrical conductivity, boiling point elevation, etc. Sensors or monitors for assaying any of these properties may be selected from those known and used in the art, and the control circuitry may be of any type known and used in the art for this purpose.

For instance, the Concentrated Recovered Aircraft Deicing Fluid Extraction Pump (k) may be governed by a control unit adapted to provide feedback control to the Concentrated Recovered Aircraft Deicing Fluid Extraction Pump so as to maintain a relatively steady flow of high-glycol water at a known concentration (or concentration range) from the system, typically and preferably 35% to 45%, most preferably about 40%. This will allow the operator to control the output concentrate of the system while providing that the energy through the evaporator is not so great that the quality of the water distillate is compromised by glycol content.

In addition, the system of the present invention may also be monitored and controlled so as to produce condensed water from the evaporator of desired or pre-determined high quality.

The scrubbing column (h) may incorporate trays that allow intimate contact between the evaporated vapor having a small glycol concentration, and dilute RDAF.

In a preferred embodiment, a bubbler may be provided for further removal of glycol from the steam outgoing from the evaporator. The bubbler may be in the form of a perforated plate above the evaporation surface(s) and having apertures through which perforations the steam may pass. Each of the apertures is provided with a condenser plates (preferably concave) disposed above each aperture against which the steam strikes, causing small amounts of glycol remaining in the steam to condense onto the underside of these condenser plates. The inlet conduit may dispense the dilute RADF fluid above the plate so that it forms a shallow bath atop the perforated plate before pouring through the apertures or over the edges to the evaporator surface. This flow of in-coming dilute RADF picks up small droplets of glycol to be returned to the evaporator plate(s) and the lower portion of the flash vessel.

The deicing fluid normally has a glycol content of 15-25 weight percent (monopropylene, monoethylene or diethylene) with an addition of thickener, normally a maximum of 1% of the total amount of glycol. The concentration range may extend to lower values, the dilution depending on the freezing point depression required, and this in turn is a function of weather and wait time prior to aircraft takeoff In addition, additives of anionic and/or nonionic tensides, corrosion inhibitors and, in certain cases, colorings in a mixture with water, solid particles, salts etc. are included. Since the deicing fluid normally is buffered, it has a pH of about 6-8.

The RADF once collected may have a concentration of glycol well below 5% (typically about 0.25%). The present invention allows for the collected RADF to be sent directly to the MVR system of the present invention, even at concentrations well below 5% and without the pre-evaporative use of reverse osmosis, although other pre-concentration processes such as reverse osmosis may be used in accordance with the present invention.

All publications and patents mentioned herein are hereby incorporated by reference to the same extent as if each individual publication or patent was specifically and individually indicated to be incorporated by reference.

Although only several exemplary embodiments of this invention have been described in detail, it will be readily apparent to those skilled in the art that the novel produced waste treatment process, and the apparatus for implementing the process, may be modified from the exact embodiments provided herein, without materially departing from the novel teachings and advantages provided by this invention, and may be embodied in other specific forms without departing from the spirit or essential characteristics thereof. Therefore, the disclosures presented herein are to be considered in all respects as illustrative and not restrictive. It will thus be seen that the objects set forth above, including those made apparent from the preceding description, are efficiently attained. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, and the drawing) may be combined in any combination, except combinations where at least some of the features are mutually exclusive. Alternative features serving the same or similar purpose may replace each feature disclosed in this specification (including any accompanying claims, and the drawing), unless expressly stated otherwise. Thus, each feature disclosed is only one example of a generic series of equivalent or similar features. Further, while certain process steps are described for the purpose of enabling the reader to make and use certain water treatment processes shown, such suggestions shall not serve in any way to limit the claims to the exact variation disclosed, and it is to be understood that other variations, including various treatment additives or alkalinity removal techniques, may be utilized in the practice of my method.

Many variations of the present invention within the scope of the appended claims will be apparent to those skilled in the art once the principles described herein are understood. The intention is to cover all modifications, equivalents, and alternatives falling within the scope and spirit of the invention, as expressed herein above and in any appended claims. The scope of the invention, as described herein and as indicated by any appended claims, is thus intended to include variations from the embodiments provided which are nevertheless described by the broad meaning and range properly afforded to the language of the claims, as explained by and in light of the terms included herein, or the legal equivalents thereof.

What is claimed is:

1. A method of removing and recycling water from glycol-containing water collected at an airport following use of said glycol as a de-icing agent, said method comprising:
   (a) collecting water containing said glycol in a holding vessel at an airport or conducting the water containing the glycol in a conduit directly from the de-icing site; and
   (b) removing water from said water containing said glycol by an evaporative process; wherein, after removing the water, the glycol concentration of said water containing said glycol is in the range of from about 35% to about 45%; and
   (c) recycling said water for use at said airport.

2. The method according to claim 1 wherein said water is recycled for a use selected from the group consisting of (1) irrigation, (2) cleaning of aircraft, (3) runway cleaning at said airport.

3. The method according to claim 1 wherein the glycol concentration is about 40%.

4. The method according to claim 1 wherein the evaporative process comprises:
   continuously removing water from said water containing said glycol through a monitored mechanical vapor recompression system, so as to produce a flow of water containing said glycol having a concentration of about 40%.

5. The method according to claim 1 wherein the water collected in step (a) has an initial concentration of glycol less than 5%.

6. The method according to claim 5 wherein the water collected in step (a) has an initial concentration of glycol less than 0.25%.

7. The method according to claim 1 wherein the method is conducted at or above atmospheric pressure.

8. The method of claim 1 wherein the method further comprises a pretreatment step comprising a filter to remove suspended matter.

9. The method according to claim 1 wherein the glycol is recycled for a use selected from the group consisting of a coolant, dust control, and windshield fluid.

* * * * *